United States Patent [19]

Schwarze et al.

[11] Patent Number: 5,027,438
[45] Date of Patent: * Jul. 2, 1991

[54] OPERATING ROOM CLOTHING WITH COATED FABRIC

[75] Inventors: Charles P. Schwarze, Fairfield, Conn.; Edmund S. Rumowicz, Somerset; Robert M. Coletti, East Brunswick, both of N.J.

[73] Assignee: Burlington Industries, Inc., Greensboro, N.C.

[ * ] Notice: The portion of the term of this patent subsequent to Apr. 12, 2005 has been disclaimed.

[21] Appl. No.: 403,781

[22] Filed: Sep. 8, 1989

Related U.S. Application Data

[63] Continuation-in-part of Ser. No. 143,766, Jan. 14, 1988, abandoned, which is a continuation-in-part of Ser. No. 946,015, Dec. 24, 1986, Pat. No. 4,736,467.

[51] Int. Cl.$^5$ .................................... A41D 13/12
[52] U.S. Cl. ............................. 2/114; 2/82; 2/227; 128/849; 428/246; 428/907
[58] Field of Search ............... 128/849; 2/DIG. 7, 51, 2/82, 114, 227, 228; 428/246, 907; 604/360

[56] References Cited

U.S. PATENT DOCUMENTS

| | | | |
|---|---|---|---|
| 3,349,285 | 10/1967 | Belkin | 2/114 X |
| 3,521,624 | 7/1970 | Gander et al. | 128/132 D |
| 3,691,570 | 9/1972 | Gaines et al. | 428/907 X |
| 3,868,728 | 3/1975 | Krzewinski | 2/114 |
| 4,196,245 | 4/1980 | Kitson et al. | 2/DIG. 7 X |
| 4,214,320 | 7/1980 | Belkin | 2/114 |
| 4,372,309 | 2/1983 | Fowler | 604/360 X |
| 4,395,454 | 7/1983 | Baldwin | 428/290 |
| 4,408,996 | 10/1983 | Baldwin | 128/132 D X |
| 4,433,026 | 2/1984 | Molde | 428/252 |
| 4,499,139 | 2/1985 | Schortmann | 428/245 |
| 4,504,978 | 3/1985 | Gregory et al. | 2/114 X |
| 4,586,196 | 5/1986 | White | 2/114 |
| 4,707,400 | 11/1987 | Towery | 428/246 X |
| 4,736,467 | 4/1988 | Schwarze et al. | 2/114 |
| 4,846,822 | 7/1989 | Foxman | 428/246 X |
| 4,869,953 | 9/1989 | Watson et al. | 428/246 X |

Primary Examiner—Wm. Carter Reynolds
Attorney, Agent, or Firm—Nixon & Vanderhye

[57] ABSTRACT

A system of operating room garments including two-component scrub pants with an elastic waist band and elastic bands in the mid-thigh area to define a containment zone between the two and knit cuffs at the ankle area, to be worn under a tabard for maximum protection against bacterial transmission as required and, over both, a surgical gown is worn with barrier panel sleeves and in the chest area extending from the neck to the mid-thigh area. The barrier panel composed of a bacteriostatically-treated polyester/cotton fabric sandwiched between a pair of water repellent, microporous urethane-coated fabrics or high-density woven fabrics, the composite being stitched together. The system provides the choice of garment selection depending upon the surgical procedure involved.

36 Claims, 2 Drawing Sheets

OPERATING ROOM CLOTHING WITH COATED FABRIC

CROSS-REFERENCE TO RELATED APPLICATION

This application is a continuation-in-part of Ser. No. 07/143,766 filed Jan. 14, 1988, now abandoned, which, in turn, is a continuation-in-part of Ser. No. 06/946,015 filed Dec. 24, 1986, now U.S. Pat. No. 4,736,467.

BACKGROUND OF THE INVENTION

This invention relates to clothing worn by a surgeon or other medical practitioner in an operating room or other surgical environment. Specifically, the invention includes a multi-component series of specially constructed garments including scrub pants, a tunic and, over both, a surgical gown. Each of the three components is constructed of specific materials that are selected based upon the surgical procedure involved, primarily the time required for the procedure, as well as other medical considerations.

Reusable surgical gowns and drapes have traditionally been made of cotton or a cotton/polyester blend having a high thread count, such as 140-thread count per square inch for cotton muslin up to 240 to 280 threads per square inch for tighter woven pima cotton. Higher thread counts afford smaller interstices between the threads. These reusable woven materials are washed, sterilized, usually by autoclaving in steam, and wrapped in a sterile package to retain sterility until use. After use, the reusable gown is recycled by again washing, autoclaving, sterile wrapping, etc. Multiple use garments for medical applications require careful washing and sterilization because of the concern for potential contamination from one procedure and event to the next. Thus, single use disposable garments, particularly for medical applications, have been well received.

Prior proposals for surgical gowns and drapes include a three-component laminate as described in U.S. Pat. No. 4,433,026 composed of a knit cotton layer and a polyester continuous filament outer layer with an expanded yet breathable PTFE film interposed between the two. The expanded PTFE film laminated between the two fibrous layers is said to permit water vapor to pass through the composite, but nothing is mentioned about the effect, if any, upon bacteria or other pathogens.

U.S. Pat. No. 4,499,139 describes a one piece non-woven bacterial barrier material in which a small cell foam is placed within the non-woven substrate to define a bacterial barrier. Absorbent microbiocidal fabrics are described in U.S. Pat. Nos. 4,408,996; 4,414,268; 4,395,454 and 4,425,372. These patents describe surgical drapes that have an absorbent, highly-wettable, bioactive surface made of a non-cellulosic substrate with a non-leachable, bioactive compound fixed to the substrate. Non-woven fabrics treated to repel water, saline solution, body fluids and solvents are described in U.S. Pat. Nos. 4,411,928 and 4,467,013. The non-woven fabric is provided with a bioactive finish, and the fabrics so-produced are described as useful for the construction of surgeon's gowns, medical drapes, isolation gowns, instrument wraps and the like.

To our knowledge, the art does not describe a system of multiple garments to be worn in the operating room or area of other surgical procedure that will protect the patient from the aerial dispersion of pathogens from the personnel in the operating room, yet remain comfortable for the medical practitioner to wear, especially for extended periods of time for those procedures during which the garments are worn for several hours. At least one garment of our invention is provided with bacteriostatic barrier panels strategically placed at those portions of the garment most likely to permit bacterial release, yet the barrier panels remains durable, comfortable and effective to resist wet bacterial strike through. Preferably, all of the garments are provided with a bacteriostatic finish that is substantive on the fabric and confers antibacterial properties to each of the garments. The garments are constructed in such a way as to contain pathogens originating from the wearer in those areas of the garment most likely to cause concern as well as to prevent, to the extent possible, airborne bacteria from escaping below the garments.

BRIEF DESCRIPTION OF THE INVENTION

Disclosed is a system of operating room garments including two-component scrub pants with, preferably, an elastic waist band and a pair of elastic bands in the mid-thigh area to define a containment zone between the two, and knit cuffs at the ankle area. The scrub pants are worn under a tabard or tunic which may be worn for more stringent operating conditions where maximum protection against bacterial transmission is required, and over both, a surgical gown is worn optionally with barrier panel sleeves, at least up to the elbow, and in the chest area extending from the neck to the mid-thigh area. The surgical gown extends to floor length or nearly floor length.

The composite barrier material of this invention is resistant to the transmission of pathogens and is composed of an inner layer of fabric having an effective amount of a bacteriostatic compound on it. The inner layer is sandwiched between a pair of water repellent, moisture vapor permeable, microporous urethane-coated fabric outer layers. Each of these coated outer layers has a water repellency of at least 90 according to AATCC 22-1980, on a scale of 1 to 100, and a moisture vapor transmission of at least 600, preferably at least 800 grams per square meter per 24 hours according to ASTM-E96-B. Preferably each of these coated outer layers has at least one of (1) a hydrostatic pressure resistance of at least 69 kPa, (2) a hydrostatic resistance of at least 25 pounds per square inch according to Federal Test Method Standard 191A, Method 5512, (3) a Slowinski Rain Test Value of less than 0.3 grams according to AATCC 35-1980, (4) a moisture penetration of less than 20 mg/m$^2$ at 200 pounds of continuous water pressure for 30 minutes, (5) a Frazier air permeability value (ASTM D737-75) of less than about 1, desirably less than 0.5 cubic foot per minute per square foot of fabric.

Also disclosed is a barrier panel composed of a bacteriostatically-treated polyester/cotton fabric sandwiched between a pair of tightly woven, fine denier, water vapor permeable polyester fabrics, preferably at least half of which is polyester, that are virtually impenetrable to bacteria, the composite being stitched together. The system provides a selection of garments depending upon the surgical procedure involved, and affords economy in that the less rigorous procedures will not require all three garments, in combination, and/or may permit the use of garments constructed of less costly materials, for instance without the various barrier panels, again depending upon the surgical procedure.

Specific components of this system include scrub pants, an undergown tabard, a full length surgical gown and a barrier panel composite that may be placed at strategic positions in constructing the scrub pants, tabard or the surgical gown.

DETAILED DESCRIPTION OF THE INVENTION

Post-operative wound infection can be attributed to several sources. Among the list of possible routes of bacterial transmission is the surgeon's gown. Worn over conventional "scrub" attire, the gown must be constructed so that both fabric and design contribute to form an effective bacteria barrier between patient and surgeon. Most reusable gowns are marginal at best when evaluating durable bacterial barrier properties and assuring sterility after previous use(s) is always a concern.

Our invention includes a complete system of operating room clothing designed for various classes of operation and allows selection of any combination of garments based on duration of the surgical procedure, the patient's susceptibility to infection and the planned surgical activity, i.e., situs of the procedure. The longer, more difficult operations which would normally produce a greater probability of developing a post-operative infection require the use of a package of operating room clothing designed to afford maximum protection for the patient. Less severe procedures require fewer items in a package composed of less rigorous and less costly, lesser quality barrier materials.

Each piece of clothing in this complete system is described in detail below.

Surgical Garments: For most procedures, traditional scrub pants or "scrubs" are constructed of antimicrobial-treated fabrics specially treated with an antimicrobial material that inhibits the growth of bacteria and thus reduces the number of bacteria released into the air where airborne transmission of bacteria is of concern in the operating room. The scrub pants are made with stockinette cuffs at the ankles.

Figure 1:
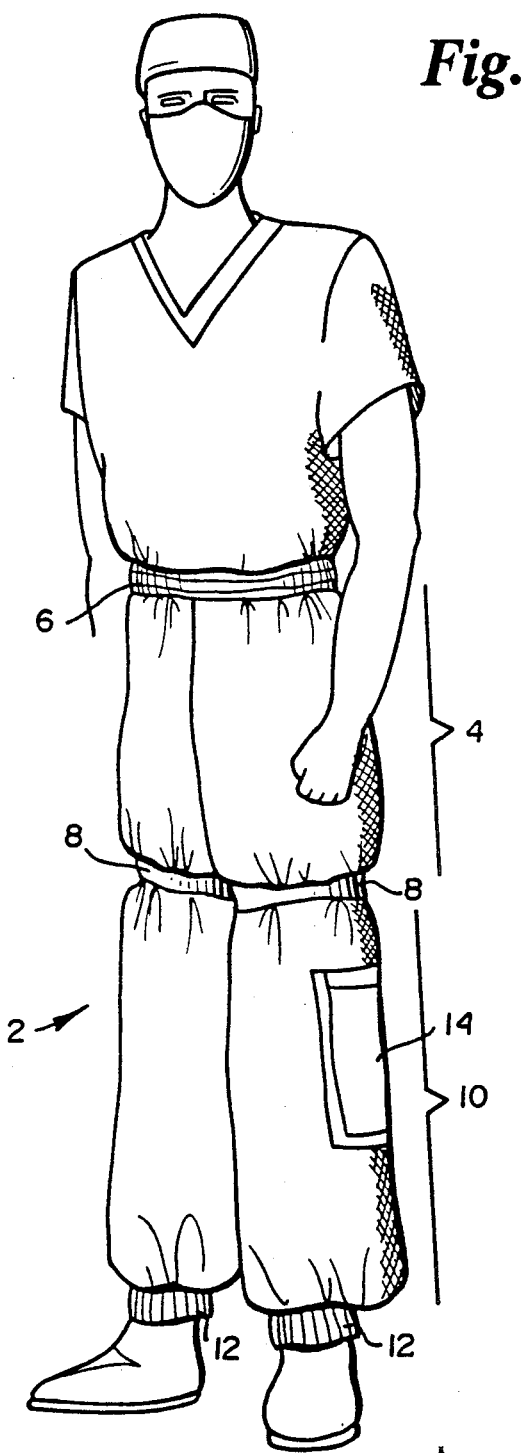
FIG. 1 is a perspective illustration of a surgeon wearing the two-component scrub pants in accordance with the invention.

Two component scrub pants in accordance with the invention are shown in FIG. 1. The perineal area of the body has been identified as disseminating the greater number of pathogens; see Ritter et al, "The Surgeon's Garb", Clinical Orthopaedics 153 p.204–209 (1980). To contain this potentially dangerous flora, scrub pants with a tightly woven, fine denier polyester barrier fabric from elastic waist to elastic band in the mid thigh area are constructed. The remainder of the pant is composed of an antimicrobial treated polyester/cotton blend product.

Figure 3:
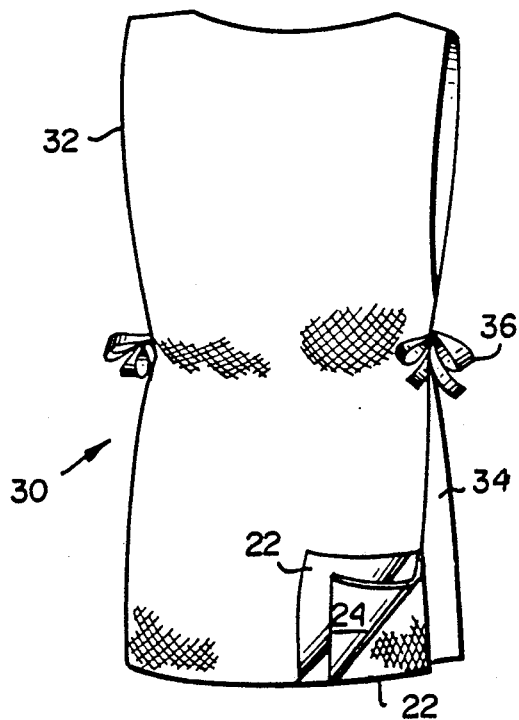
FIG. 3 is a front view of a tabard or tunic the front of which is made of the barrier material of FIG. 2.
Figure 4:
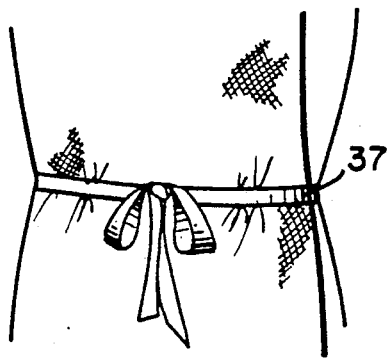
FIG. 4 is a partial perspective view of the waist of the same tunic.
Figure 5:
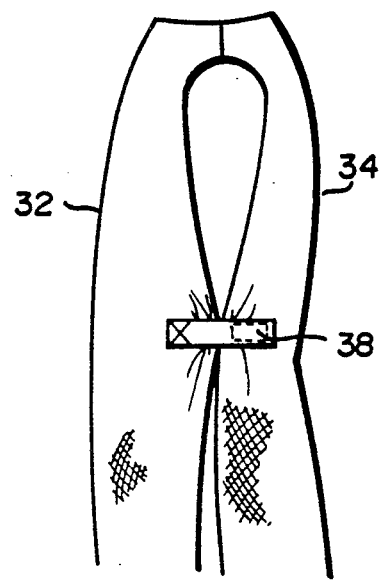
FIG. 5 is a perspective view of the side another waist closure arrangement for a tunic.

The tabard illustrated in FIGS. 3–5 with side closures is for more severe operating conditions where maximum protection against bacterial transmission is required. This garment is designed to be worn over the scrub outfit (pants plus shirt) and under the surgical gown.

Figure 6:
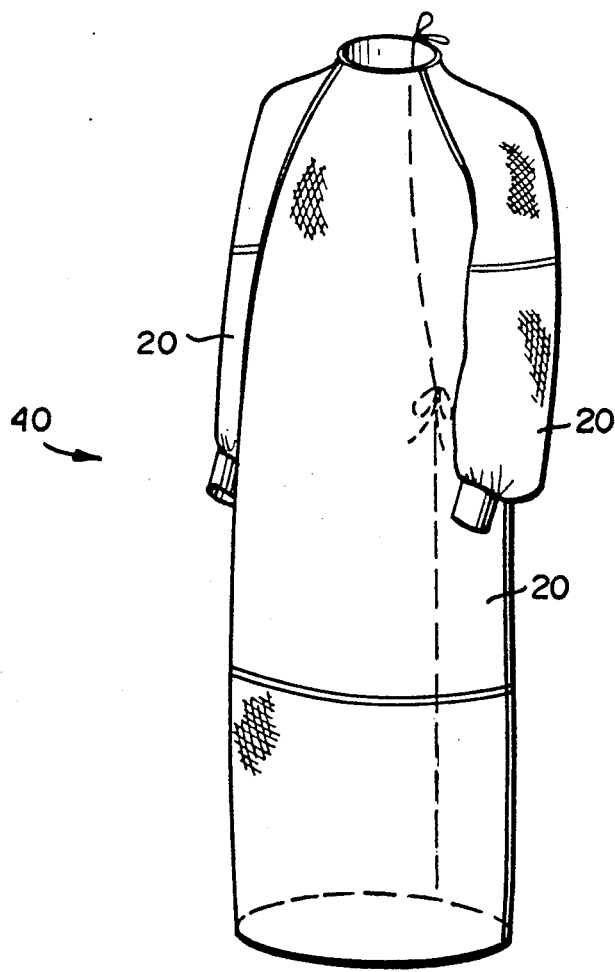
FIG. 6 is a perspective front view of a surgical gown with the sleeve portions and front panel from the neck to below the knee area made of the barrier panel composite of FIG. 2.

Current barrier panels in existing gowns are not as effective as they should be with regard to durability and resistance to wet bacterial strike through. To solve this problem, the barrier panel will be composed of a single ply of light weight fabric treated with a bacteriostatic material preferably woven from an intimate blend of 65% polyester fibers and 35% cotton fibers made from 26/1 yarns. Sandwiching this polyester/cotton fabric are two single layers of light weight, tightly woven polyester. Unlike previous proposals, the three layers are not laminated or glued together; they are stitched around the edges. This composite construction has proven to be an effective bacterial barrier. The barrier panel is used in the surgical gown in the sleeves up beyond the elbow, in the chest area from the neck to the mid thigh area, and from side to side. Antimicrobial-treated fabric is used in all other areas of the gown. To improve the gown's efficacy in preventing airborne bacteria from escaping below (conventional gowns are mid-calf length), the gown's length is extended to the shoe-top level as shown in FIG. 6.

The above description applies to a single layer or ply of the fabric; the novel bacterial barrier material of this invention includes a pair of such fabrics with a bacteriostatic polyester/cotton blend layer between them making the entire barrier structure even more impenetrable to bacteria.

The polyester/cotton blend fabric that is optionally treated with a bacteriostatic material forming the center layer of the barrier structure is preferably made from a spun yarn containing an intimate blend of 65% polyester fibers and 35% cotton fibers in which the construction is 26/1 warp filling yarns. A preferred source of such a fabric is commercially available from Burlington Industries, Inc. under the trademark CONCEPT®. This particular poly/cotton blend accepts the antimicrobial material well and retains it in the fabric and on the fiber structure.

The antimicrobial compound is a broad spectrum bacteriostatic (or biostatic) material and for convenience is frequently referred to herein as a bacteriostat or bacteriostatic material. The preferred antimicrobial compound applied to the scrub pants, tabard and surgical gown, plus inner layer of the barrier composite is a member of the class of silicone quaternary amines. The preferred silicone quaternary amine antimicrobial material is 3-(trimethoxysilyl)- propyloctadecyldimethyl ammonium chloride the use of which is described in U.S. Pat. No. 3,730,701, the disclosure of which is hereby incorporated by reference. Suitable antimicrobial silyl quaternary amine compounds have the formula:

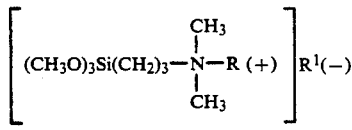

in which R is a $C_{11-22}$ alkyl group and $R^1$ is chlorine or bromine. The preferred silicone quaternary ammonium compound is 3-(trimethoxysilyl)propyloctadecyldimethyl ammonium chloride and is available as a 42% active solid in methanol from Dow Corning Corporation of Midland, Mich., under the designation DC-5700. This material is well accepted in commerce and has the necessary U.S. regulatory approvals, not only as a bacteriostatic textile treatment, but also as a bacteriocidal component for medical device/non-drug applications.

The amount of the silicone quaternary amine antimicrobial compound applied to the fabric substrate will be within the following limits: the minimum amount is the quantity needed to achieve a specific minimum level of bacteriostatic activity, or to allow for process variations, if any, to maintain a specific, predetermined level of bacteriostatic activity. The maximum amount will be limited by loss of substantivity as evidenced by crocking during garment construction, excessive wash- or leach-out during laundering or in use, or otherwise, and is balanced by the cost of this relatively expensive component. Best results are obtained when the silicone quaternary amine is present in an amount of from 0.01 to 1.0% by weight, calculated on the weight in the fabric, and preferably in the range of 0.05 to 0.5% by weight similarly calculated.

In addition to the antimicrobial compound, the fabric may be treated with other textile finishes and adjuvants including antistatic agents, water repellents, alcohol and solvent repellents, soil release agents, dyes, tints, optical brighteners, softening agents, sizing resins and the like. The preferred finishes include a soil release agent such as Scotchgard 258 ®, Scotchgard FC-248 ® and Prym 119 ® (acrylic soil release agent) with the antimicrobial agent. The preferred antimicrobial agent, Dow Corning 5700, is cationic and care must be taken in formulating this material with other components, particularly surfactants used to emulsify the polymeric soil release agents. A recommended procedure, in view of this potential incompatibility, is to apply the otherwise incompatible components in separate steps. As an illustration, it is convenient to apply the soil release agent in a first step, such as by padding followed by removing any excess liquid, then applying the antimicrobial compound followed by drying and curing to firmly attach the finish(es) to the substrate. Care in application technique enables one to achieve an uncommonly high degree of washfastness, even fastness to harsh industrial launderings.

Another moisture-vapor-permeable, breathable fabric suitable for constructing the barrier panel is a urethane-coated fabric having a microporous open cell structure resistant to water (rain) yet water vapor permeable. This microporous, urethane-coated, water vapor permeable, water-resistant, fabric, by itself as a single ply, treated with a bacteriostatic agent, could in fact perform as a low cost alternative barrier panel. Such a fabric is available from Burlington Industries, Inc., under the name ULTREX and has the following characteristics:

| TESTS | PERFORMANCE |
| --- | --- |
| 1. Stormproofness Slowinski Rain Test AATCC 35-1980 | .04–.14 gm Original .08–.25 gm 10 Washings |

This test measures the resistance of fabrics to the penetration of water under static pressure as encountered during a storm. ASTM specifies a fabric to be stormproof if less than 1 gram of water is absorbed by blotter paper with shower head pressure of 3 ft/5 min.

| 2. Moisture Penetration Test Burlington R&D Test Method | 11–16 mg/in² Original 11–20 mg/in² 10 Washings |
| --- | --- |

This test demonstrates how well the fabric stands up to wetness under 200 pounds of continuous pressure such as kneeling on wet ground or sitting in a wet chair lift for a period of thirty minutes.

| 3. Water Repellency Spray Test AATCC 22-1980 | 100 Original 90 10 Washings 80 25 Washings |
| --- | --- |

Scale 1 to 100. This test measures surface wetting. ASTM specifies minimum requirements of 90 for an original sample and 70 after 5 launderings for a smooth textured fabric.

4. Hydrostatic Resistance 25–40 pounds per square inch
Federal Test Method Standard
191 A Method 5512

The U.S. Military rates the minimum level on this test at 25. This test measures the high range resistance of a fabric then subjected to water under high pressure over a short period of time. The hydrostatic testing machine steadily increases water pressure on a single point of the fabric until it bursts. This bursting point is well beyond any normal rainstorm. Preferably the composite barrier is composed of an outer barrier fabric having a hydrostatic resistance of at least 25 pounds per square inch according to this test method.

5. Breathability
Moisture Vapor Transmission
1000–1250 gm/m²/24 hrs
ASTM E96-B

This upright cup method uses water placed in a cup with fabric stretched over the top in a controlled environment. Moisture vapor passes through the fabric and is measured in terms of weight lost over a 24 hour period.

6. Windproofness/Downproofness 0–0.5 c.f.m.
Air Permeability
Frazier Method
ASTM D737-75

This test measures cubic feet, per minute of air able to penetrate the weave. Air permeability has a direct correlation to windproofness. Ordinary nylon fabric used in windbreakers will yield between 3 and 6 ft³/min/ft².

Microporous, moisture-vapor-permeable fabrics having other desirable properties such as flame resistance, resistance to ultra violet light degradation and, most importantly, having antimicrobial properties are described in PCT/87US/02278, the disclosure of which is hereby incorporated by reference.

The invention will now be further described with reference to the attached Figures.

DETAILED DESCRIPTION OF THE DRAWINGS

The two-component special scrub pants 2 as illustrated in FIG. 1, are designed to isolate the perineal area of the medical practitioner's body to contain, to the extent possible, potentially worrisome flora. The upper or seat portion 4 is constructed of a bacterial barrier panel, as described in more detail below, and is defined by an elastic or other adjustable waist band 6 and a pair of elastic leg bands 8 positioned at approximately the mid-thigh area which is above the knee joint and is a more comfortable location for the wearer. The bottom or balance portion 10 of the pants are made of a polyester/cotton blend, preferably a spun yarn containing an intimate blend of polyester and cotton fibers and at least half of the blend is polyester, treated with an antimicrobial material and are closed with a pair of stockinette anklets 12. As depicted in FIG. 1, a pocket 14 is provided in the lower portion of the scrub pants. The waist, seat and leg portions of the pants are conveniently connected by stitching.

Figure 2:
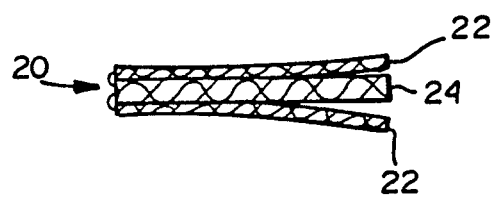
FIG. 2 is an enlarged representation of the three-component barrier panel assembly.

FIG. 2 is a greatly enlarged perspective representation of the barrier panel 20 construction used in the scrub pants described above, and optionally in the tabard and surgical gown as described in more detail below. The barrier panel 20 is fabricated from two outer layers of untreated (that is, no antimicrobial material is applied) thin, tightly woven, fine denier, polyester fabric 22 which provides a comfortable, water vapor permeable surface that readily transmits moisture vapor, is highly water resistant and is comfortable for the wearer. An additional, valuable property is that this extremely compact fabric has no or virtually no measurable interstices and is thus highly resistant to bacteria passing through it. The barrier panel 20 extends at least half of the distance from the neck to the bottom of the surgical gown and preferably at least two-thirds of the distance from the neck to the bottom of the surgical gown as shown in FIG. 6. The inner layer 24 of the composite is formed from a polyester/cotton blend, and is preferably a fabric woven from a spun yarn containing an intimate blend of polyester fibers and cotton fibers, either woven or knit, which has been treated with an effective amount of bacteriostatic silyl quaternary amine ammonium compound as described above. It is preferred that the three components of the barrier layer be stitched around the perimeter rather than needle punched or adhesively secured and laminated together to allow for maximum wearer comfort and to maintain water vapor permeability of the outer layers. The lower portion of the tunic in FIG. 3 (shown partially separated) also shows the three component barrier layer with the individual layers exposed.

FIGS. 3-5 show three different views of the tabard or tunic 30 that may be worn underneath the surgical gown 40, again depending upon the nature of the surgical procedure involved. The tabard includes a front surface 32, a back surface 34 stitched together across the top and open along both sides and secured together with a pair of side ties 36, Velcro closures 38 or a waist band 37 that may be tied in the front of the back. Preferably, the front portion of the tabard is made of the panel 20, while the back portion may be constructed of a less costly material, for instance the bacteriostatically treated polyester/cotton blend described above or it is woven from a spun yarn containing an intimate blend of polyester fibers and cotton fibers. The tabard 30 is used for severe operating conditions where maximum protection against bacterial transmission is required, and worn over the scrub outfit or scrub pant 2, but under the surgical gown 40.

A surgical gown 40 is depicted in FIG. 6, and extends virtually the full length of the medical practitioner. In the version depicted in FIG. 6, barrier panels 20 are provided on both sleeves from the wrist area extending up and beyond the elbow portion of the garment. In addition, the front portion of the garment extending from about the neck line and back to the mid-thigh area is also constructed of the barrier panel material 20 described above. The gown is secured by any convenient method, for instance, as shown in FIG. 3, by a pair of ties. The balance of the gown is constructed from a polyester and cotton, preferably a spun yarn containing an intimate blend of polyester and cotton fibers at least half of which is polyester, bacteriostatically treated as described above, and is provided with a neck opening and a pair of elastic cuffs composed of the same material as the barrier panel. Preferably, any seams in the barrier will be taped or otherwise treated on the backside (not shown) to prevent moist bacterial strike through. Preferably, the body of the surgical gown is formed by a front portion stitched to a back portion.

The barrier panel 20 as depicted in FIG. 2 is designed to be light-weight, comfortable to the surgeon, yet effective in preventing bacterial strike through. The panel is a combination or sandwich construction made of a polyester/cotton blend base material 24 that has been treated with an antimicrobial agent and surrounded by a pair of high density woven fabrics or microporous, water-vapor-permeable urethane-coated fabrics 22. The panel 20 is sewn together around the edges and is not glued or laminated in any way. In use, should any bacteria be able to penetrate the very tightly woven outer layer(s) 22, the bacteria will be killed or effectively dealt with the bacteriostatic middle layer. This specific construction provides an effective bacterial barrier layer, where necessary, and the complete gown is designed to be light-weight, comfortable (water vapor permeable), and durable.

Other arrangements or means of constructing the garments depicted above will be apparent to those skilled in this art. The drawings and illustrations given above are merely considered exemplary as defining preferred embodiments of the invention.

While the invention has been shown and described as what is presently conceived to be the most practical and preferred embodiment, it will be apparent to those skilled in the art that many modifications may be made within the scope of the invention, which scope is to be accorded the broadest interpretation of the appended claims so as to encompass all equivalent garments, systems and procedures.

What is claimed:

1. A composite barrier material resistant to the transmission of pathogens and composed of an inner layer of fabric having an effective amount of a bacteriostatic compound thereon sandwiched between a pair of water repellent, moisture vapor permeable, microporous urethane-coated fabric outer layers each having a water repellency of at least 90 according to AATCC 22-1980 and a moisture vapor transmission of at least 600 grams per square meter per 24 hours.

2. The composite barrier material of claim 1, in which the outer layer fabric is a waterproof, water-vapor-permeable, urethane-coated fabric having a hydrostatic pressure resistance of at least 69 kPa.

3. The composite barrier material of claim 1, in which the outer layer fabric has a moisture vapor transmission rate of at least 800 grams per square meter per 24 hours.

4. The composite barrier material of claim 1, in which inner fabric is a blend of polyester and cotton at least half of which is polyester.

5. The composite barrier material of claim 3, in which the outer fabric has a hydrostatic resistance of at least 25 pounds per square inch according to Federal Test Method Standard 191A, method 5512.

6. The composite barrier material of claim 5, in which the outer fabric has a Slowinski Rain Test Value of less than 0.3 grams according to AATCC 35-1980.

7. The composite barrier material of claim 1, in which the outer fabric has a moisture penetration of less than 20 mg/in$^2$ at 200 pounds of continuous water pressure for 30 minutes.

8. The composite barrier material of claim 3, in which the outer fabric has a Frazier air permeability value of less than about 1 cubic foot per minute per square foot.

9. The composite barrier material of claim 8, in which the outer fabric has a Frazier air permeability value of less than about 0.5 cubic feet per minute per square foot.

10. The composite barrier material of claim 4, in which the inner fabric is woven from a spun yarn containing an intimate blend of polyester fibers and cotton fibers.

11. The composite barrier material of claim 1, substantially completely devoid of adhesive between the layers.

12. The composite barrier material of claim 1, in the form of a drapeable panel stitched together at least around its perimeter.

13. The composite barrier material of claim 1, in which the bacteriostatic compound on the inner fabric layer is a silyl quaternary ammonium compound of the formula:

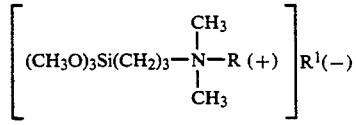

wherein R is an alkyl of 11 to 22 carbon atoms and R$^1$ is a bromine or chlorine.

14. A lower body garment having leg portions and comprising:
a waist portion,
a seat portion,
a pair of leg portions,
expandable leg-conforming means with each leg portion below the waist portion, and stitching connecting the waist, seat and leg portions,
the garment between the waist portion and the leg-conforming means constructed of water repellent moisture vapor permeable, microporous, urethane-coated fabric, resistant to the transmission of pathogens, having water repellency of at least 90 according to AATCC 22-1980 and a moisture vapor transmission of at least 600 grams per square meter per 24 hours, the balance of the garment constructed of an antimicrobial fabric.

15. The lower body garment of claim 14, in which each leg portion has an expandable, ankle-conforming cuff at the bottom thereof.

16. The lower body garment of claim 14, in which each expandable leg-conforming means is in the thigh area of each leg portion.

17. The lower body garment of claim 16, in which the portion between the waist and leg-conforming means is a waterproof, water-vapor permeable urethane coated microporous fabric having a hydrostatic pressure resistance of at least 69 kPa.

18. The lower body garment of claim 17, in which the water repellent fabric has a moisture vapor transmission rate of at least 800 grams per square meter per 24 hours.

19. The lower body garment of claim 14, in which the balance of the garment is a blend of polyester and cotton at least half of which is polyester.

20. The lower body garment of claim 19, in which the balance of the garment is a woven fabric woven from a spun yarn containing an intimate blend of polyester fibers and cotton fibers.

21. The lower body garment of claim 19, in which the bacteriostatic compound on the polyester and cotton blend fabric is a silyl quaternary ammonium compound of the formula:

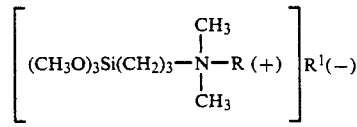

wherein R is an alkyl of 11 to 22 carbon atoms and R$^1$ is a bromine or chlorine.

22. A surgical tabard for use under a surgical gown, the tabard having a neck opening, two arm openings, bacteriostatic, antimicrobial back portion and a front portion constructed of a water repellent, moisture vapor permeable, microporous urethane coated fabric, resistant to the transmission of pathogens having a water repellency of at least 90 according to AATCC 22-1980 and a moisture vapor transmission of at least 600 grams per square meter per 24 hours.

23. The surgical tabard of claim 22, in which the front portion is a waterproof, water vapor permeable, urethane-coated fabric having a hydrostatic pressure resistance of at least 69 kPa.

24. The surgical tabard of claim 22, in which the fabric used to compose the garment's back portion is woven from a spun yarn containing an intimate blend of polyester fibers and cotton fibers.

25. The surgical tabard of claim 22, in which the bacteriostatic compound on the fabric of the back portion is a silyl quaternary ammonium compound of the formula:

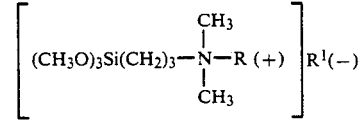

wherein R is an alkyl of 11 to 22 carbon atoms and R$^1$ is a bromine or chlorine.

26. A surgical gown having a neck opening, a pair of sleeves, an expandable cuff at the end of each sleeve, and a front portion stitched to a back portion to form the body of the surgical gown, in which at least half of the front portion from the neck downward is constructed of a composite barrier material resistant to the transmission of pathogens and composed of an inner layer of polyester/cotton blend, fabric having an effective amount of a bacteriostatic compound thereon sandwiched between a pair of water repellent, moisture vapor permeable outer fabric layers each having a water repellency of at least 90 according to AATCC 22-1980 and a moisture vapor transmission of at least 600 grams per square meter per 24 hours, the remaining portions of the gown constructed from a biostatic or bacteriostatic fabric.

27. The surgical gown of claim 26, in which the sleeves and cuffs are constructed of the same composite barrier material as the front portion.

28. The surgical gown of claim 26, in which the composite barrier material extends from the neck opening downward to at least two-thirds of the front portion.

29. The surgical gown of claim 26, in which the outer fabric has a hydrostatic pressure resistance of at least 25 pounds per square inch according to Federal Test Method Standard 191A, Method 5512.

30. The surgical gown of claim 26, in which the composite barrier material on the front portion of the gown is stitched together at least around its perimeter.

31. The surgical gown of claim 29, in which the bacteriostatic compound on the inner fabric layer of the composite barrier material is a silyl quaternary ammonium compound of the formula:

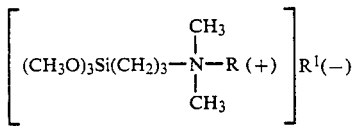

wherein R is an alkyl of 11 to 22 carbon atoms and $R^1$ is a bromine or chlorine.

32. The surgical gown of claim 29, in which the inner fabric of the composite barrier material is a fabric woven from a spun yarn containing an intimate blend of polyester fibers and cotton fibers.

33. The surgical gown of claim 32, in which the bacteriostatic compound on the inner fabric layer and the bacteriostatic fabric from which the balance of the gown is constructed is a silyl quaternary ammonium compound of the formula:

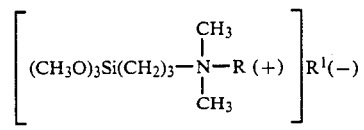

wherein R is an alkyl of 11 to 22 carbon atoms and $R^1$ is a bromine or chlorine.

34. In combination, a surgical operating garment system including:

a lower body garment having leg portions comprising a waist portion, a seat portion, a pair of leg portions, expandable leg-conforming means with each leg portion below the waist portion, and stitching connecting the waist, seat and leg portions, the garment between the waist portion and the leg-conforming means constructed of a water-repellent moisture vapor permeable, microporous urethane coated fabric resistant to the transmission of pathogens, each having a water repellency of at least 90 according to AATCC 22-1980 and a moisture vapor transmission of at least 600 grams per square meter per 24 hours, the balance of the garment constructed of a bacteriostatic, antimicrobial fabric, and a surgical gown having a neck opening, a pair of sleeves, an expandable cuff at the end of each sleeve, and a front portion stitched to a back portion to form the body of the surgical gown, in which at least half of the front portion from the neck downward is constructed of said water repellent, moisture vapor permeable, microporous urethane coated fabric, the remaining portions of the gown constructed from a fabric having a bacteriostatic compound thereon.

35. The surgical operating garment system of claim 34, in which the microporous fabric is a waterproof, water-vapor permeable, urethane-coated fabric having a hydrostatic pressure resistance of at least 69 kPa.

36. The surgical operating garment system of claim 35, in which the bacteriostatic, antimicrobial fabric forming the balance of the garment is a fabric woven from a spun yarn containing an intimate blend of polyester fibers and cotton fibers.

* * * * *